(12) United States Patent
Aoustin

(10) Patent No.: US 10,483,848 B2
(45) Date of Patent: Nov. 19, 2019

(54) ASSEMBLY FOR CONTROLLING SOLID-STATE SWITCHING ELEMENTS IN AN AIRCRAFT

(71) Applicant: Zodiac Aero Electric, Montreuil (FR)

(72) Inventor: Loïc Aoustin, Montreuil (FR)

(73) Assignee: ZODIAC AERO ELECTRIC, Montreuil (FR)

( * ) Notice: Subject to any disclaimer, the term of this patent is extended or adjusted under 35 U.S.C. 154(b) by 161 days.

(21) Appl. No.: 15/662,128

(22) Filed: Jul. 27, 2017

(65) Prior Publication Data
US 2018/0034366 A1 Feb. 1, 2018

(30) Foreign Application Priority Data
Jul. 27, 2016 (FR) ..................... 16 57239

(51) Int. Cl.
*H02M 3/156* (2006.01)
*H02J 4/00* (2006.01)

(52) U.S. Cl.
CPC ............... *H02M 3/156* (2013.01); *H02J 4/00* (2013.01)

(58) Field of Classification Search
CPC .................................. H02M 3/156; H02J 4/00
See application file for complete search history.

(56) References Cited

U.S. PATENT DOCUMENTS

2011/0179292 A1* 7/2011 Clegg ................... G06F 1/26
713/300
2015/0253743 A1* 9/2015 Lee ........................ G06F 3/00
307/116

\* cited by examiner

*Primary Examiner* — Robert L Deberadinis
(74) *Attorney, Agent, or Firm* — Christensen O'Connor Johnson Kindness PLLC

(57) ABSTRACT

Disclosed herein is an assembly for controlling solid-state switching elements in an aircraft having at least one power pathway comprising at least one power line supplying power to at least one item of equipment on board an aircraft from at least one electrical power source via a power switch, and at least one control member controlling at least one power switch according to control signals arising from a control means. The control assembly comprises a single power supply supplying power to the control members.

7 Claims, 4 Drawing Sheets

ASSEMBLY FOR CONTROLLING SOLID-STATE SWITCHING ELEMENTS IN AN AIRCRAFT

BACKGROUND

The technical field is that of solid-state power controllers and, more particularly, the control of such controllers.

Solid-state power controllers (SSPCs) are elements that make it possible to manage the distribution of electrical power to aircraft loads via lines conveying the electrical power and the protection of these lines. They are composed of a control portion and a power portion, comprising switching elements based on semiconductor components. The term "aircraft loads" is understood to mean on-board items of equipment that consume electrical power. They are generally installed on circuit boards.

These circuit boards, generally called switchboards or SSPC boards, comprise at least one power pathway controlled by a solid-state power controller, or SSPC controller. A circuit board is generally composed of multiple power pathways per SSPC board. Each power pathway comprises a power switch, which closes or opens the connection between a power source and a load, and which is composed of one or more switches. The switches may be of JFET (junction gate field-effect transistor), MOSFET (metal-oxide-semiconductor field-effect transistor), IGBT (insulated-gate bipolar transistor) or bipolar transistor type. These switches may be produced in various materials, such as Si, SiC or GaN. This power switch is combined with a control member, the control portion of the SSPC controller, in order to control these switches in complete safety.

A switching pathway is said to be protected since the SSPC controller monitors the amplitude of the currents and voltages passing through the pathway according to nominal values. The SSPC controller is capable of interrupting the electrical power supply through the pathway in the event that one or more of these values is exceeded by controlling the switching of the power switch.

Switchboards generally form part of the on-board electrical distribution equipment of aircraft. Due to the average power transmitted by the power pathways involved, these protection boards form part of the secondary distribution equipment.

It must be possible to regulate the closing time of a switching pathway in a controlled manner, in order to limit the inrush current during closing phases with a capacitive load. This means controlling the power switches such that the impedance seen from the source is essentially resistive and varies gradually in order to allow a gradual rise in the output voltage. Such behaviour of the output voltage is hereinafter referred to as "soft-start" control.

The opening time of the power pathway must, however, be fast enough to prevent damage to the power pathway in the event of a short circuit.

FIG. 1 illustrates an architecture of the prior art with one power supply and one control means per power pathway, the power supply and the signal arising from the control means being electrically isolated. Two power pathways 1a, 1b included in an SSPC board 2 may be seen. Each power pathway 1a, 1b comprises a power line 6a, 6b connected in series with a power switch 7a, 7b and a measurement resistor 8a, 8b. Each power switch 7a, 7b is controlled by a control member 9a, 9b.

Each power pathway 1a, 1b comprises a control means 10a, 10b connected to the control member 9a, 9b and to the measurement resistor 8a, 8b via isolation means 3a, 3b, 4a, 4b, 5a, 5b. The isolation means may be optocouplers, magnetic couplers or any other information transfer system with galvanic isolation. It should be noted that the isolation means 5a, 5b connected to the measurement resistor 8a, 8b and the corresponding measurement resistor may be replaced by a Hall effect sensor which allows both the current flowing through the power line 6a, 6b to be measured and the control means 10a, 10b to be galvanically isolated from the corresponding power line 6a, 6b.

The means for isolating the power supply 3a, 3b are for example transformers allowing galvanic isolation.

Each control means 10a, 10b comprises logic elements allowing a command to be sent to the control member 9a, 9b as long as no overly high current fault has been measured. In such a case, the command intended for the control member 9a, 9b is overridden and replaced by an opening command the purpose of which is to protect the aircraft loads and the wiring connected to the power line.

FIG. 1 illustrates one example of such a control means 10a, 10b, comprising a comparison means 11a, 11b connected to the set input of a fault memorization system referenced 12a, 12b. The output of the latch is connected to an AND logic gate 13a, 13b which additionally receives the control signal to be transmitted to the control member 9a, 9b.

The means 11a, 11b for comparing a measurement of the current flowing through the corresponding power pathway with a memorized reference value is capable of transmitting, as output, a Boolean value on the basis of the comparison.

When the transmitted signal corresponds to an exceedance of the memorized reference value, the latch 12a, 12b is locked so as to maintain the transmission of this signal. The signal corresponding to an exceedance of the memorized reference value then blocks the control signal received at input of the logic gate 13a, 13b. This situation persists regardless of the value subsequently transmitted by the comparison means 11a, 11b and until an appropriate signal is received on the reset input of the latch 12a, 12b.

In the case of the architecture illustrated by FIG. 1, certain drawbacks are apparent.

The greater the number of protected pathways, the larger the area occupied by the isolated power supplies. Specifically, in this architecture, one protected pathway switched by one control member corresponds to the use of one isolated power supply and one isolated command. The multiplication of components required to control multiple protected pathways is accompanied by an increase in costs, in dissipated power and in the area required for implementation, at the expense of useful area for power switches.

The greater the number of switching pathways, the shorter the mean time before failure (MTBF) of the SSPC board. Specifically, the isolated power supply and the galvanic isolation members play a very large role in the MTBF value of a circuit board, more particularly of an SSPC board.

The presence of multiple switched-mode power supplies leads to electromagnetic compatibility issues which are difficult to solve without filtering. The multiplication of pathways on one and the same board amplifies these interferences and the area occupied by the various filters becomes non-negligible.

Achieving soft-start control using this architecture requires the addition of an isolation means and other elements which in turn increase the space occupied.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One object of the disclosed aspects and embodiments is to decrease the number of components required with respect to the prior art and the electromagnetic signature in order to simplify the design and increase the reliability of said board.

One aspect is an assembly for controlling solid-state switching elements in an aircraft having at least one power pathway comprising at least one power line supplying power to at least one item of equipment on board an aircraft from at least one electrical power source via a power switch, and at least one control member controlling at least one power switch according to control signals arising from a control means. The control assembly comprises a single power supply supplying power to the control members.

Another aspect is a circuit board comprising at least one control assembly such as described above.

DESCRIPTION OF THE DRAWINGS

Other objects, features and advantages of the invention will become apparent on reading the following description, which is given solely by way of non-limiting example and with reference to the appended drawings, in which.

DETAILED DESCRIPTION

Figure 1:
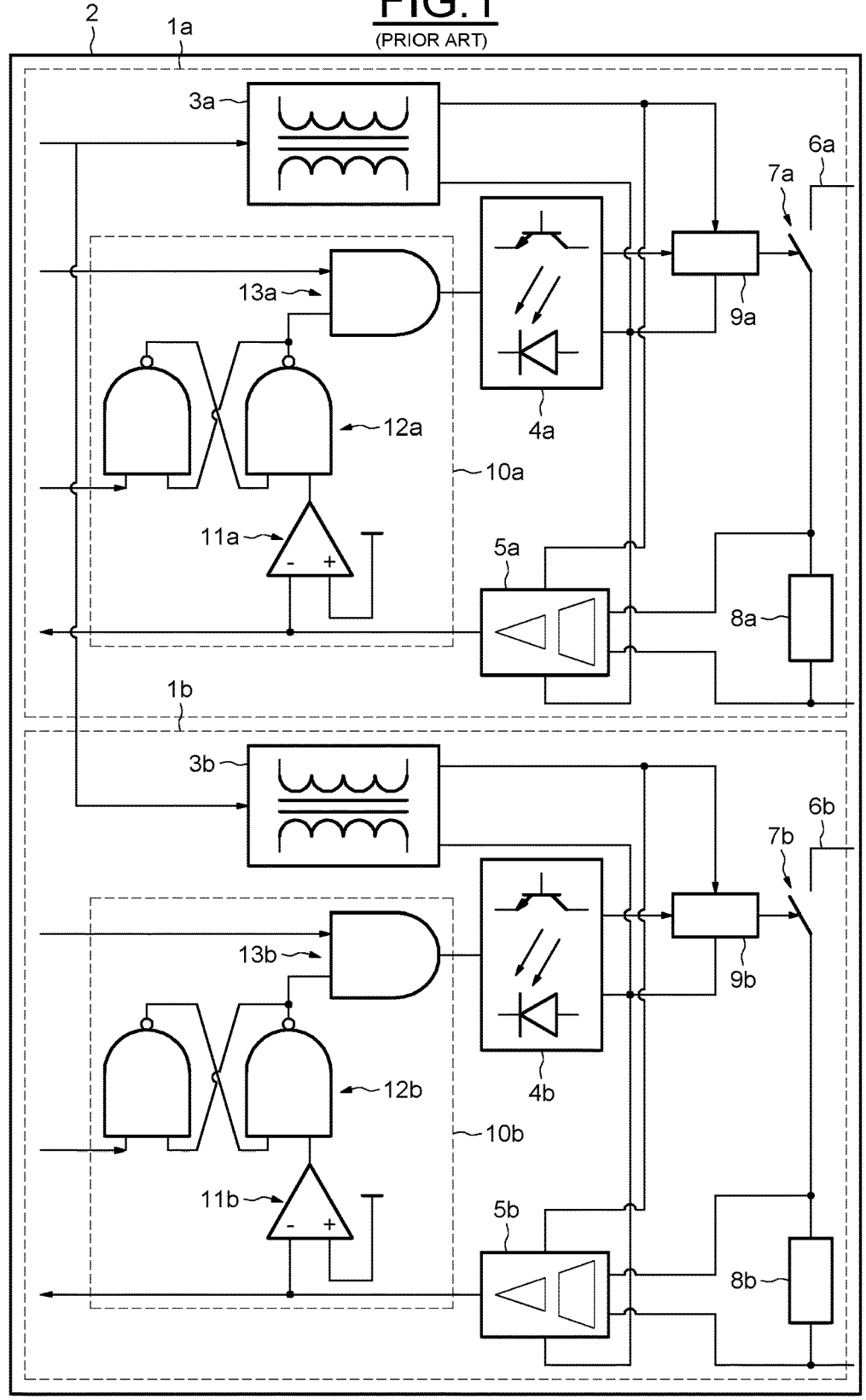
FIG. 1 illustrates the main elements of a switching circuit board comprising one power supply and one control means per power pathway according to the prior art, the power supply and the control signal arising from the control means being electrically isolated.

One object of the invention is to decrease the number of components required with respect to the prior art and the electromagnetic signature in order to simplify the design and increase the reliability of said board.

One subject of the invention is an assembly for controlling solid-state switching elements in an aircraft having at least one power pathway comprising at least one power line supplying power to at least one item of equipment on board an aircraft from at least one electrical power source via a power switch, and at least one control member controlling at least one power switch according to control signals arising from a control means. The control assembly comprises a single power supply supplying power to the control members.

The single power supply may be electrically isolated with respect to the control means.

The control assembly may comprise at least one analogue level offset means positioned between the control means and a control member and the analogue level offset means being capable of maintaining the amplitude of the control signal transmitted by the control means while changing the reference potential of the control signal from the reference potential of the control means to the reference potential of the control member and of the isolated power supply.

The control member may comprise a Darlington transistor capable of switching the power switch to an off position when no command is received from the control means.

The control member may comprise a first transistor, the base of which is connected to a first input, the collector of the first transistor being connected to the power switch, a first resistor and a second resistor being connected in parallel by one of their terminals to the emitter of the first transistor, the first resistor being connected by its other terminal to the collector of a second transistor, the emitter of the second transistor being connected to ground and to the other terminal of the second resistor, the base of the second transistor being connected to the second input, the control member being capable of controlling the power switch in analogue or digital according to the control signals received at input.

At least one means, which is electrically isolated, for measuring the current flowing through the power pathway may be connected both to the control means and to at least one power line.

At least one means, which is not electrically isolated, for measuring the current flowing through the power pathway may be connected both to the control means and to at least one power line.

The offset means may comprise a first transistor and a second transistor, the first transistor being connected by its emitter to the reference potential of a control means, its collector being connected to the isolated power supply, its base being connected to the control terminal of the control means, the second transistor being connected by its base to the drain of the first transistor, by its emitter to the isolated power supply and by its collector to the power switch.

Another subject of the invention is a circuit board comprising at least one control assembly such as described above.

Such a protection board has the following advantages.

The decrease in the number of isolated power supplies and isolation means is accompanied by an increase in the useful area for power portions, a decrease in manufacturing cost, a decrease in the total power dissipated by the protection functions, an increase in the MTBF of the circuit board and a drastic decrease in the electromagnetic signature. It should be noted that the power supply and the isolation means play a very large role in the MTBF value of a circuit board, more particularly of an SSPC board.

The non-isolated analogue/digital control also makes it possible to control, using the same control member/analogue offset means assembly, a power pathway in on/off mode (digital control using maximum switching edges), or by choosing its closing time (analogue control for gradual closing).

Since the power supply is common to all of the power pathways, the latter may be downsized if not all of the power pathways are controlled at the same time. Power sharing is possible, since the power is mainly required when switching the power switches. The power supply may also be made redundant in order to increase reliability.

The non-isolated current measurement, in particular by means of differential amplifier, make it possible to test the analogue measurement chain and the "hard trip" easily using built-in test (BIT) means.

Figure 2:
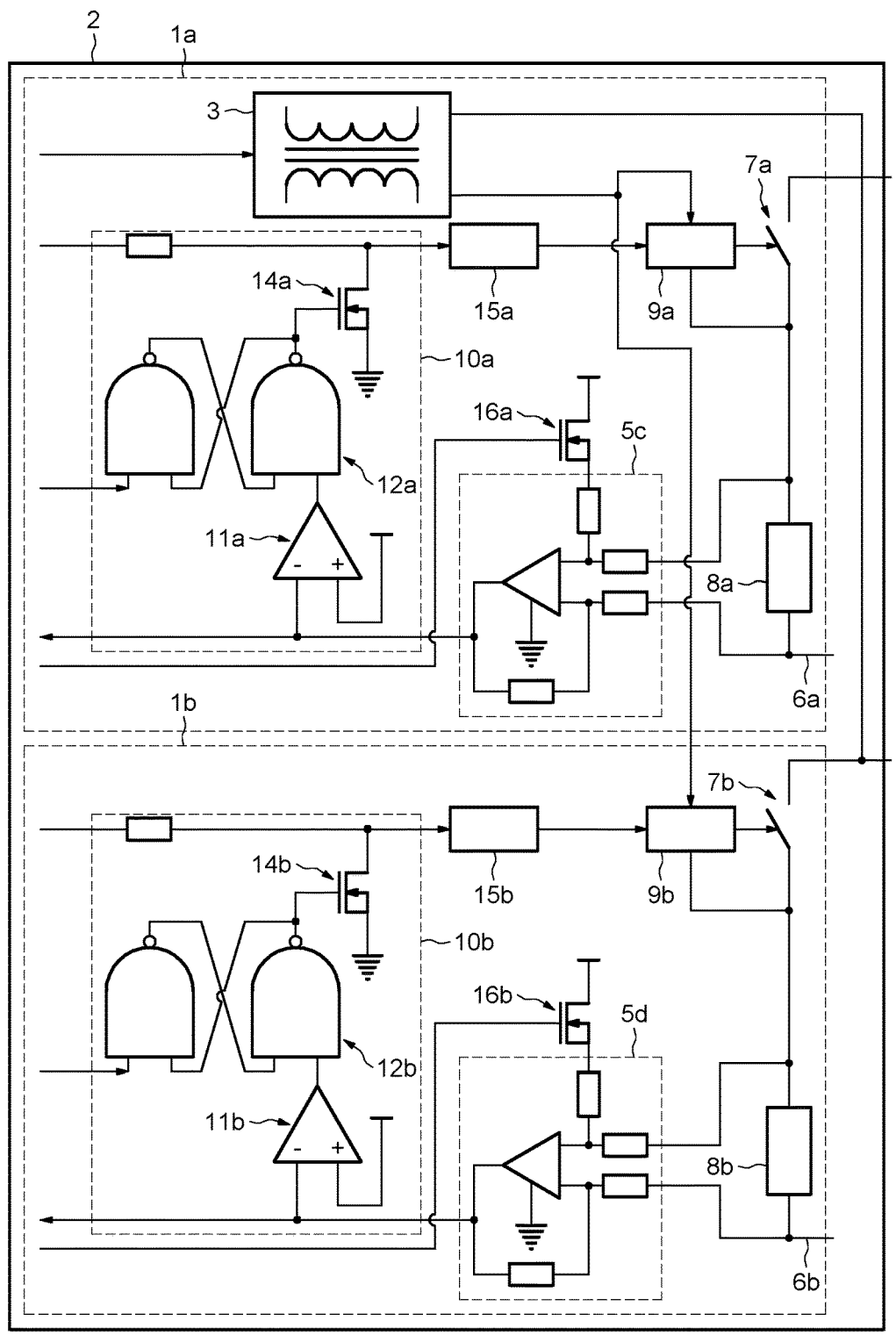
FIG. 2 illustrates the main elements of a switching circuit board comprising a single isolated power supply and a control signal arising from the control means transmitted via an analogue level offset means according to the invention.

FIG. 2 illustrates a circuit board, in particular a switching circuit board, comprising a single power supply that is electrically isolated with respect to the ground of the control means 3 and control signals transmitted via analogue level offset means 15a, 15b. The elements that are similar to those of FIG. 1 bear the same references.

The control member 9a, 9b integrated into each switching circuit board may be made from a discrete component which is not galvanically isolated.

This architecture comprises a single electrically isolated power supply 3 supplying power to each power pathway 1a, 1b. The use of a single power supply makes it possible to be rid of, or at least to decrease substantially, issues linked to electromagnetic compatibility constraints.

The isolated power supply 3 and the power pathways 1a, 1b share the same reference potential. The amplitude of the voltage of the single power supply depends on the type of power switch chosen.

The control members 9a, 9b are each linked at input to an analogue level offset means 15a, 15b transmitting the control signals. The control signals are voltages determined according to the aircraft load and the chosen type of power switch. In the control means 10a, 10b, this voltage is referenced to the ground of the electronic components. However, the control member uses a different reference potential which is dependent on the supply voltage and the isolated power supply. Since the reference potentials are not identical, a control signal intended for the control members cannot be used as is by the control members. The analogue level offset means 15a, 15b allow the amplitude and the form of the control signals to be retained while changing the reference potential thereof so that they can be interpreted correctly by the control members 9a, 9b.

The non-electrically isolated level offset means, with linear operation, allow a switching time of the power switches to be easily defined. Specifically, the control voltage or current of the power switch is dependent on the voltage applied to the control of the control member. Thus, by modulating this voltage, it is possible to control the closing time.

This makes it possible, for example, to achieve soft-start control by determining a switching time of the power switches allowing the current to be limited in the event of closing with a capacitive load. This gradual closing thus limits the instantaneous current and avoids tripping overcurrent protection.

This control member makes it possible to control the switching of the power switch by controlling the voltage across the terminals of the switch or by controlling the current flowing through said switch. The choice of control depends on the loads to be switched and the type of power switch employed. Depending on the power switch to be controlled, such as MOSFET, bipolar transistor or IGBT, the control of the power switch may vary. Said control may thus be current ramp control for a bipolar transistor, constant voltage ramp control or voltage ramp control on the gate-source voltage VGS for IGBTs and MOSFETs.

In the event of loss of power supply, the control member is designed to block the power switch automatically. For example, the control signal of the power switch is cut by means of a Darlington transistor 25a, 25b. Furthermore, the use of "standard" components makes it possible to employ multiple sources for the provision of the various components of the architecture in order to decrease costs and facilitate maintenance.

In addition to the control member with a common power supply, the use of a non-isolated current measurement member 5c, 5d makes it possible to omit all digital and analogue isolation means of the board, and to facilitate carrying out a built-in test of the current measurement.

In FIG. 2, it may be seen that such a measurement is made in a non-electrically isolated manner using an operational amplifier, the inputs of which are connected to the terminals of the measurement resistor 8a, 8b and the output of which transmits a signal proportional to the current flowing through the resistor. A transistor of MOSFET type may be used in order to add a DC component to one of the inputs of the operational amplifier and thus generate an overcurrent fault that is capable of saturating the operational amplifier. When a test signal is received by the amplifier, said amplifier saturates, thereby allowing the operation thereof to be tested the received measurement value with respect to the expected value.

Lastly, it should be noted that the control means 10a, 10b comprises a MOSFET transistor 14a, 14b in place of the logic gate 13a, 13b. When this transistor 14a, 14b receives an error signal via the latch 12a, 12b, it is turned on, thereby shorting the control signal. In such a situation, the control signal is maintained at a zero value regardless of the control signal received. This arrangement thus operates in the same way as the logic gate illustrated in FIG. 1.

This architecture may be adapted to a power supply via an AC network by modifying the analogue level offset means 15a, 15b. Specifically, the use of an analogue level offset means such as employed with a DC power supply is not possible with an AC power supply, since the supply voltage may be lower than the reference voltage of the switching circuit board.

Figure 3:
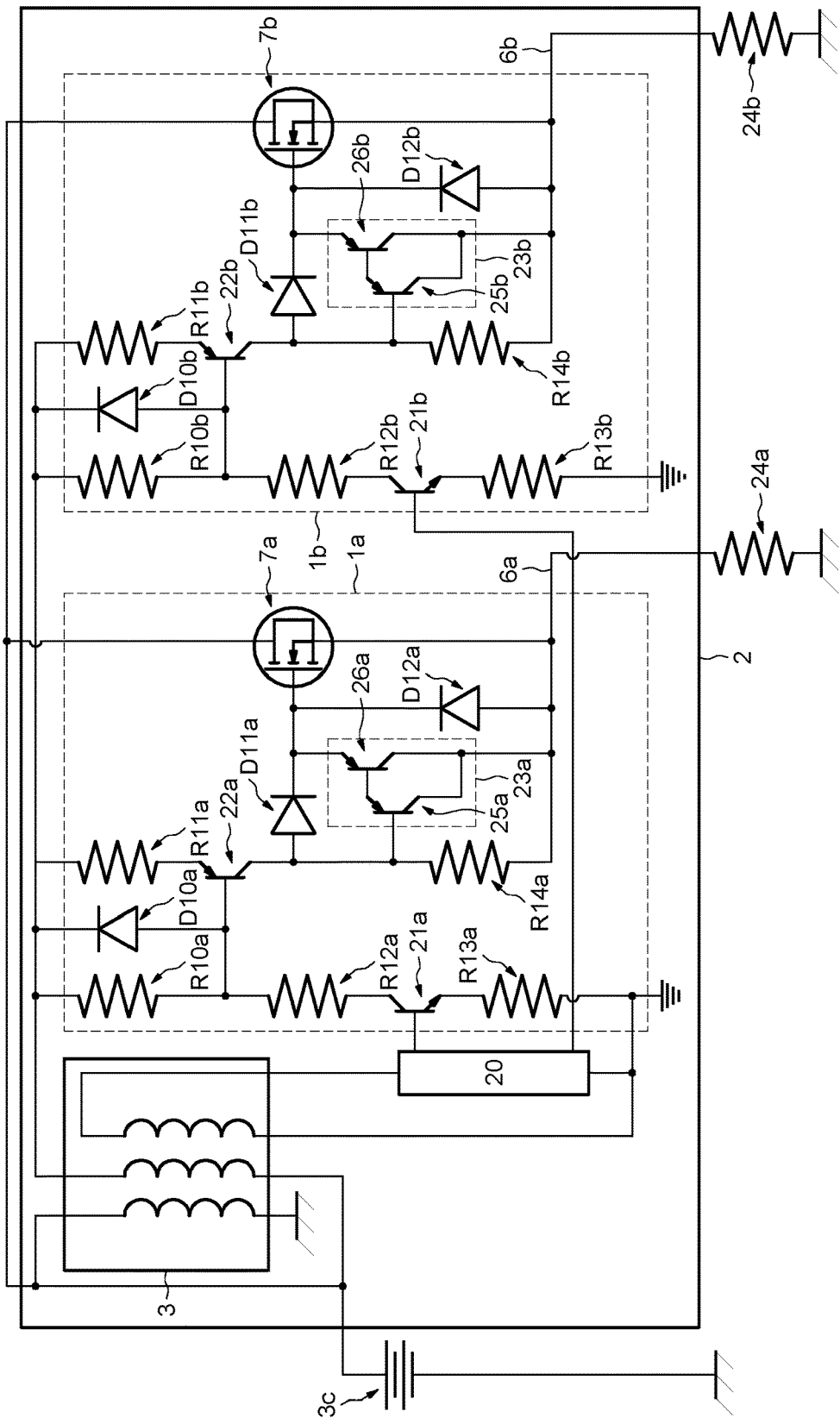
FIG. 3 illustrates the main discrete elements of a switching circuit board having a single electrically isolated power supply and the transmission of a control signal via an analogue level offset means according to the invention.

FIG. 3 shows one embodiment of a switching circuit board having a single electrically isolated power supply and a control signal transmitted via an analogue level offset means. The switchboard 2 comprises two power pathways 1a, 1b having in common the drain of MOSFET transistors included in the power switch 7a, 7b. The reference potential of the isolated power supply 3 is therefore connected to this point. The isolated power supply 3 and the power pathways 1a, 1b are supplied with power via the DC bus 3c of the aircraft. It is also possible to supply power to the isolated power supply via another power source. The power pathways 1a, 1b each supply at least one aircraft load 24a, 24b.

The control signals of these two power pathways 1a, 1b are determined by a microcontroller 20 operating in analogue or in digital. The control signals are transmitted via a buffer, or via a digital-to-analogue converter.

The analogue level offset means 15a, 15b comprise an NPN bipolar transistor and a PNP bipolar transistor. Another type of analogue offset system may be used, such as a magnetic component, an optical coupling, or else an integrated semiconductor.

The NPN transistor referenced 21a, 21b is connected by its emitter to the reference potential of the microcontroller 20, its collector being connected to the isolated power supply 3, its base being connected to the control terminal of the microcontroller 20.

The PNP transistor referenced 22a, 22b is connected by its base to the drain of the NPN transistor 21a, 21b, by its emitter to the isolated power supply 3 and by its collector to the gate of the MOSFET transistor of the power switch 7a, 7b.

The NPN bipolar transistor 21a, 21b makes it possible to receive a command having the same reference potential as the microcontroller. The PNP bipolar transistor 22a, 22b makes it possible to change the reference potential of this command by generating a current proportional to the control voltage applied by the microcontroller to the base of the NPN transistor 21a, 21b. The current thus generated is equivalent to applying a voltage to the gate of the MOSFET, the reference for which is the reference potential of the isolated power supply 3 and the amplitude of which is the same as that of the control voltage applied by the microcontroller 30 to the base of the NPN bipolar transistor 21a, 21b.

A Darlington transistor 23a, 23b is interposed between the gate of the MOSFET transistor and the collector of the PNP bipolar transistor 22a, 22b. In the event of the absence of a command transmitted by the microcontroller 20, the Darlington transistor 23a, 23b applies, to the gate of the MOSFET, a voltage equal to its blocking voltage.

It is recalled that a Darlington transistor is formed from two bipolar transistors 25a, 25b. It is therefore possible to replace a Darlington transistor by two bipolar transistors of PNP type or any other system allowing a substantially zero voltage to be maintained when no power supply or control signal is present.

In FIG. 3, it may be seen that the Darlington transistor 23a, 23b is made from PNP bipolar transistors. The control input of the assembly 25a, 26a and 25b, 26b (23a, 23b) is the base of the transistor 25a and is connected to the collector of the PNP transistor 22a, 22b. The emitter of this same Darlington transistor is connected to the gate of the MOSFET of the power switch 7a, 7b in order to block the latter. Lastly, the collector of this transistor is connected to the reference of the power switch 7a, 7b.

The resistors R10a, R10b, R1a, R11b, R12a, R12b, R13a, R13b and the diodes D10a, D10b, D11a, D11b, D12a, D12b make it possible to balance the currents in the various power pathways and make it possible to define the current or voltage levels of the control signals of the power switches. The resistors R14a, R14b allow the Darlington transistor 23a, 23b to be blocked in the event of the absence of a command and thus the power switch 7a, 7b to be blocked.

In the event of the presence of a transformer in the power supply of the switching circuit board, an additional winding may be added in order to generate the power required by the control member in order to decrease the area occupied on the switching circuit board further and to improve the MTBF.

The current may be measured by a resistor dedicated to measuring current followed by a differential amplifier accepting the common mode generated by the network used.

Figure 4:
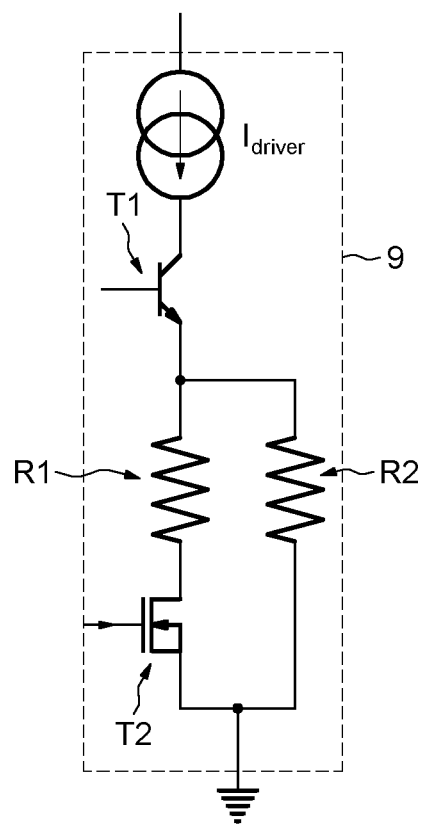
FIG. 4 illustrates the main elements of a control member having two inputs.

Alternatively, the control member 9 may receive, as input, two digital commands, making it possible to define two switching speeds. The term "digital command" is understood to mean an on/off command with two voltage levels, for example 0 V and 5 V. The second command allowing, for example, two very separate current thresholds to be defined. FIG. 4 illustrates such a control member having two inputs, comprising a first input connected, for example, to the control signal of the microcontroller 20 described with respect to FIG. 3, a second input connected to this same microcontroller allowing a soft-start command to be generated, and an output connected to the base of the transistor 22a, 22b included within the analogue level offset means 15a, 15b.

This control member comprises a bipolar transistor T1, the base of which is connected to the first input, its collector being connected to the base of the PNP transistor 22a, 22b of the analogue level offset means 15a, 15b, a first resistor R1 and a second resistor R2 being connected in parallel by one of their terminals to the emitter of the bipolar transistor T1. The first resistor R1 is connected by its other terminal to the drain of a MOSFET transistor T2, the source of the MOSFET transistor T2 being connected to ground and to the other terminal of the second resistor R2. The gate of the MOSFET transistor T1 is connected to the second input.

Any type of transistor or any other means allowing the bias current to be modified may be used, such as an NPN transistor.

Thus, when the signal from the first input switches the bipolar transistor T1, it sets up a current that is proportional to the voltage applied to the base of said transistor and proportional to the value of the second resistor R2.

When the signal from the second input switches the MOSFET transistor T2, the resistor R2 is thus in parallel with the resistor R1. It thus sets up a current that is proportional to the voltage applied to the base of the transistor T1 and proportional to the value of the two parallel resistors R1 and R2. Depending on the value of the first resistor R1 and of the second resistor R2, it is thus possible to generate two different values of a current as output from the control member to the power switch 7a, 7b.

While illustrative embodiments have been illustrated and described, it will be appreciated that various changes can be made therein without departing from the spirit and scope of the invention.

The embodiments of the invention in which an exclusive property or privilege is claimed are defined as follows:

1. An assembly for controlling solid-state switching elements in an aircraft having at least one power pathway comprising at least one power line supplying power to at least one item of equipment on board an aircraft from at least one electrical power source via a power switch,
   at least one control member controlling at least one power switch according to control signals arising from a control means,
   wherein the control assembly comprises a single power supply supplying power to all of the control members, the single power supply being electrically isolated with respect to the control means,
   wherein the assembly comprises at least one analogue level offset means positioned between the control means and a control member, and
   the analogue level offset means being capable of maintaining the amplitude of the control signal transmitted by the control means while changing the reference potential of the control signal from the reference potential of the control means to the reference potential of the control member and of the isolated power supply.

2. The assembly of claim 1, in which the control member comprises a Darlington transistor capable of switching the power switch to an off position when no command is received from the control means.

3. The assembly of claim 1, in which the control member comprises a first transistor, the base of which is connected to a first input, the collector of the first transistor being connected to the power switch, a first resistor and a second resistor being connected in parallel by one of their terminals to the emitter of the first transistor, the first resistor being connected by its other terminal to the collector of a second transistor, the emitter of the second transistor being connected to ground and to the other terminal of the second resistor, the base of the second transistor being connected to the second input,
   the control member being capable of controlling the power switch in analogue or digital according to the control signals received at input.

4. The assembly of claim 1, in which at least one means, which is electrically isolated, for measuring the current flowing through the power pathway is connected both to the control means and to at least one power line.

5. The assembly of claim 1, in which at least one means, which is not electrically isolated, for measuring the current flowing through the power pathway is connected both to the control means and to at least one power line.

6. The assembly of claim 1, in which the offset means comprises a first transistor and a second transistor, the first transistor being connected by its emitter to the reference potential of a control means, its collector being connected to the isolated power supply, its base being connected to the control terminal of the control means, the second transistor being connected by its base to the drain of the first transistor, by its emitter to the isolated power supply and by its collector to the power switch.

7. A circuit board comprising at least one assembly of claim 1.

* * * * *